(12) United States Patent
Lu

(10) Patent No.: US 11,388,503 B2
(45) Date of Patent: Jul. 12, 2022

(54) EARPHONE CHARGING SYSTEM AND CHARGING CONTROL DEVICE

(71) Applicant: DEXIN CORPORATION, New Taipei (TW)

(72) Inventor: Ho-Lung Lu, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/140,272

(22) Filed: Jan. 4, 2021

(65) Prior Publication Data

US 2022/0095036 A1 Mar. 24, 2022

(30) Foreign Application Priority Data

Sep. 18, 2020 (TW) ................ 109132273

(51) Int. Cl.
*H04R 1/10* (2006.01)
*H02J 7/00* (2006.01)
*H04M 1/60* (2006.01)

(52) U.S. Cl.
CPC .......... *H04R 1/1025* (2013.01); *H02J 7/0045* (2013.01); *H04R 1/1008* (2013.01); *H04R 1/1033* (2013.01); *H04M 1/6016* (2013.01)

(58) Field of Classification Search
CPC .... H04R 1/1025; H04R 1/008; H04R 1/1033; H02J 7/0045; H04M 1/6016
See application file for complete search history.

(56) References Cited

U.S. PATENT DOCUMENTS

| 2017/0134845 | A1* | 5/2017 | Milam | H04R 1/1058 |
| 2018/0083468 | A1* | 3/2018 | Dennis | H04R 1/1016 |
| 2021/0329363 | A1* | 10/2021 | Evans | H02J 7/0044 |

* cited by examiner

*Primary Examiner* — Andrew L Sniezek
(74) *Attorney, Agent, or Firm* — Li & Cai Intellectual Property (USA) Office

(57) ABSTRACT

An earphone charging system and a charging control device are provided. The earphone charging system includes a wireless earphone device and the charging control device. The wireless earphone device is communicatively connected to an audio providing device. The charging control device is electrically connected to the audio providing device through a first cable. The charging control device is electrically connected to the wireless earphone device through a second cable. The audio providing device provides a power and an audio signal to the wireless earphone device through the charging control device.

20 Claims, 5 Drawing Sheets

EARPHONE CHARGING SYSTEM AND CHARGING CONTROL DEVICE

CROSS-REFERENCE TO RELATED PATENT APPLICATION

This application claims the benefit of priority to Taiwan Patent Application No. 109132273, filed on Sep. 18, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an earphone charging system and a charging control device, and more particularly to an earphone charging system and a charging control device that can effectively elevate user experience.

BACKGROUND OF THE DISCLOSURE

Wireless earphones have been trending among audio-visual devices in recent years. More specifically, the development of true wireless earphones has facilitated the vigorous development of mobile audio-visual services. However, batteries in wireless earphones are generally insufficient to support long-term use, and the wireless earphone needs to be charged after being used for a period of time. In this way, interruptions may occur during gaming or viewing of audio-visual data.

Therefore, it has become an important issue in the art to provide a charging control device that does not interrupt user experiences and services.

SUMMARY OF THE DISCLOSURE

In response to the above-referenced technical inadequacies, the present disclosure provides an earphone charging system including a wireless earphone device and a charging control device. The wireless earphone device is communicatively connected to an audio providing device. The charging control device is electrically connected to the audio providing device through a first cable, and the charging control device is electrically connected to the wireless earphone device through a second cable. The audio providing device provides power and an audio signal to the wireless earphone device through the charging control device.

In another aspect, the present disclosure provides an earphone charging system including a wireless earphone device and a charging control device. The wireless earphone device is communicatively connected to an audio providing device. The charging control device is electrically connected to the audio providing device through a first cable. The charging control device is electrically connected to the wireless earphone device through a second cable, and the charging control device includes an external power connection port so as to be electrically connected to an external voltage supply and receive external power from the external voltage supply.

In yet another aspect, the present disclosure provides a charging control device for connecting an audio providing device and a wireless earphone device, and the charging control device includes a first connection port and a second connection port. The first connection port of the charging control device is electrically connected to the audio providing device through a first cable, and the second connection port of the charging control device is electrically connected to the wireless earphone device through a second cable. The wireless earphone device receives power through the charging control device to perform charging, and the audio providing device provides an audio signal to the wireless earphone device through the charging control device.

One of the advantages of the present disclosure is that, the charging control device and the earphone charging system of the present disclosure allows the wireless earphone device and the audio providing device to be charged without interrupting services and user experiences, thereby effectively improving the user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
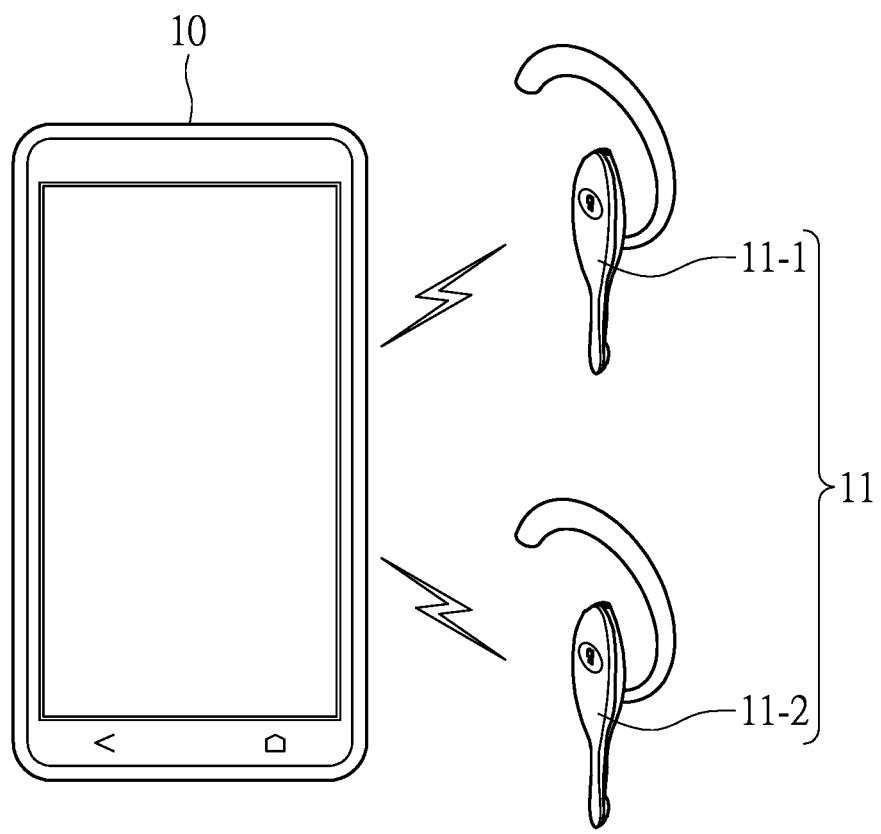
FIG. 1 is a schematic view of a wireless earphone device communicatively connected to an audio providing device.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
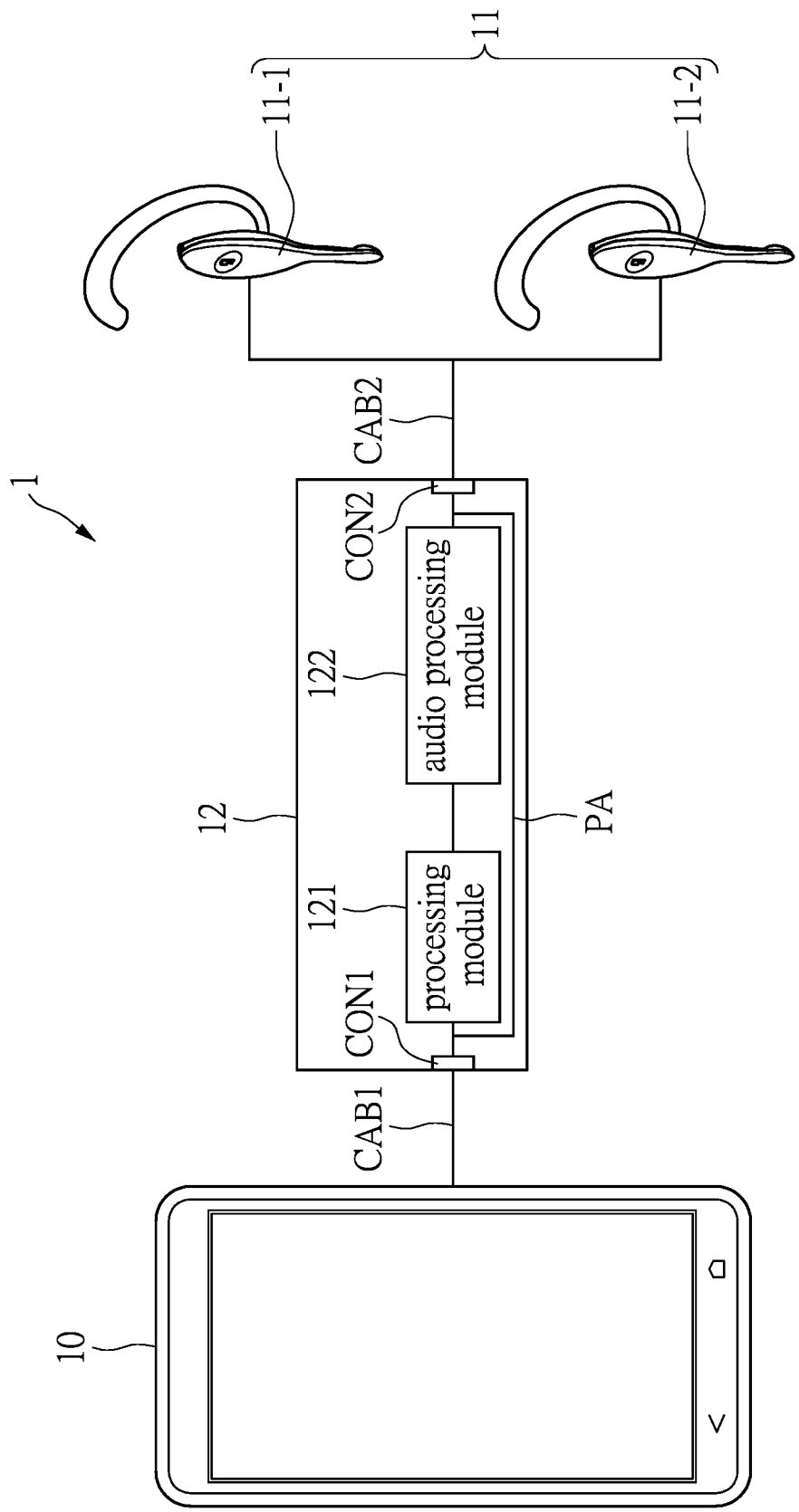
FIG. 2 is a schematic view of a charging control device in cooperation with a wireless earphone device and an audio providing device according to a first embodiment of the present disclosure.

Referring to FIG. 1 and FIG. 2, FIG. 1 is a schematic view of a wireless earphone device communicatively connected to an audio providing device. FIG. 2 is a schematic view of a charging control device in cooperation with the wireless earphone device and the audio providing device, according to a first embodiment of the present disclosure.

The earphone charging system 1 includes a wireless earphone device 11 and a charging control device 12. In this embodiment, the wireless earphone device 11 includes a first wireless earphone 11-1 and a second wireless earphone 11-2. In other embodiments, the wireless earphone device 11 can include only one wireless earphone.

The wireless earphone device 11 is communicatively connected to an audio providing device 10. The first wireless earphone 11-1 and the second wireless earphone 11-2 of the wireless earphone device 11 can both be communicatively connected to the audio providing device 10. Moreover, the first wireless earphone 11-1 of the wireless earphone device 11 can be communicatively connected to the audio providing device 10 to receive an audio signal, and then the first wireless earphone 11-1 performs transmission of the audio signal with the second wireless earphone 11-2.

Reference is made to FIG. 2, in this embodiment, when the first wireless earphone 11-1 and the second wireless earphone 11-2 of the wireless earphone device 11 have low power, a user can connect the first wireless earphone 11-1 and the second wireless earphone 11-2 of the wireless earphone device 11 to the charging control device 12, and connect the charging control device 12 to the audio providing device 10, thereby allowing the first wireless earphone 11-1 and the second wireless earphone 11-2 of the wireless earphone device 11 to be charged. At this time, the first wireless earphone 11-1 and the second wireless earphone 11-2 of the wireless earphone device 11 may be used in a way similar to that of a wired earphone, such that the wireless earphone device 11 is charged and the user can listen to audio contents without having to pause various services.

In this embodiment, the charging control device 12 is electrically connected to the first wireless earphone 11-1 and the second wireless earphone 11-2 through a second cable CAB2. The charging control device 12 is electrically connected to the audio providing device 10 through a first cable CAB1. Each of the first wireless earphone 11-1 and the second wireless earphone 11-2 has two charging contacts. The second cable CAB2 is a connecting wire that is in the shape of the letter Y, a single connection end is connected to the charging control device 12, and each of two branched ends is connected to the two charging contacts of the first wireless earphone 11-1 and of the second wireless earphone 11-2, respectively.

When the first wireless earphone 11-1 and the second wireless earphone 11-2 of the wireless earphone device 11 are electrically connected to the charging control device 12 through the second cable CAB2, and the charging control device 12 is electrically connected to the audio providing device 10 through the first cable CAB1, the audio providing device 10 then provides power and the audio signal to the first wireless earphone 11-1 and the second wireless earphone 11-2 of the wireless earphone device 11 through the charging control device 12.

That is to say, the audio providing device 10 transmits its own battery power to the first wireless earphone 11-1 and the second wireless earphone 11-2 of the wireless earphone device 11 through the charging control device 12, the first cable CAB1 and the second cable CAB2. Therefore, the first wireless earphone 11-1 and the second wireless earphone 11-2 are charged.

Reference is made to FIG. 2. Furthermore, the charging control device 12 includes a processing module 121, an audio processing module 122, and a power bypass circuit PA. The processing module 121 is electrically connected to the audio processing module 122 and the power bypass circuit PA. The processing module 121 is a central processing unit (CPU), a microprocessor, or an application-specific integrated circuit (ASIC). The audio processing module 122 is an audio processing chip for processing the audio signal.

The charging control device 12 further includes a first connection port CON1 and a second connection port CON2. The processing module 121 is electrically connected to the first connection port CON1, the audio providing device 10 is electrically connected to the first connection port CON1 through the first cable CAB1, and the audio processing module 122 is electrically connected to the second connection port CON2. The first wireless earphone 11-1 and the second wireless earphone 11-2 are electrically connected to the second connection port CON2 through the second cable CAB2.

The first cable CAB1 and the first connection port CON1 can be integrally disposed or detachably disposed. The second cable CAB2 and the second connection port CON2 can be integrally disposed or detachably disposed.

The processing module 121 is electrically connected to the audio providing device 10 through the first cable CAB1. The audio processing module 122 is electrically connected to the first wireless earphone 11-1 and the second wireless earphone 11-2 through the second cable CAB2.

At this time, the audio providing device 10 provides the power to the first wireless earphone 11-1 and the second wireless earphone 11-2 through the power bypass circuit PA. The audio providing device 10 provides the audio signal to the first wireless earphone 11-1 and the second wireless earphone 11-2 through the processing module 121 and the audio processing module 122. That is, the power and the audio signal are provided to the first wireless earphone 11-1 and the second wireless earphone 11-2 of the wireless earphone device 11 through different routes. The audio providing device 10 can be a mobile phone, a tablet computer or an audio player.

Second Embodiment

Figure 3:
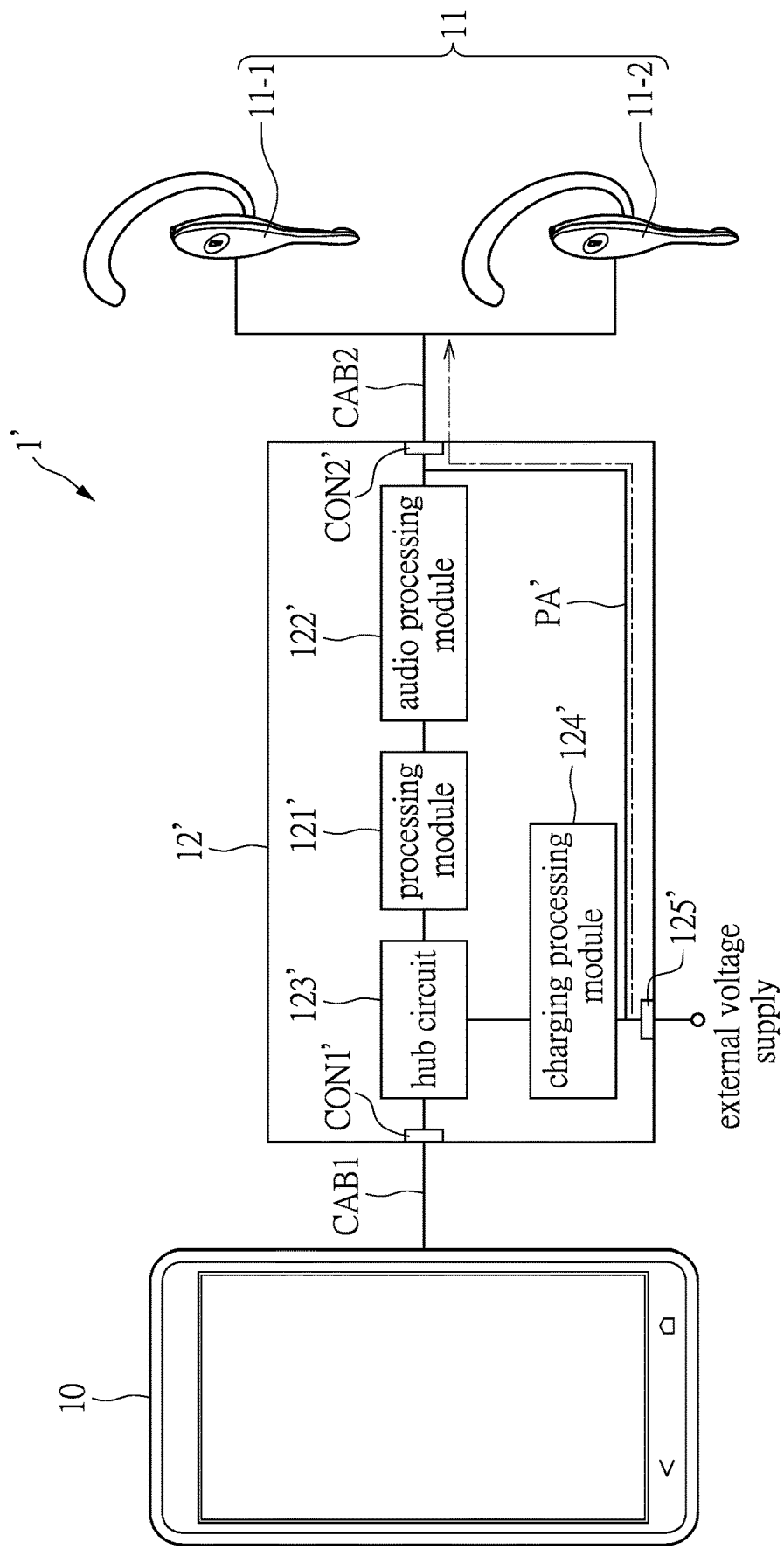
FIG. 3 is a schematic view of a wireless earphone device being charged when a charging control device is in cooperation with the wireless earphone device and an audio providing device according to a second embodiment of the present disclosure.

Referring to FIG. 3, FIG. 3 is a schematic view of a wireless earphone device being charged when a charging control device is in cooperation with the wireless earphone device and an audio providing device according to a second embodiment of the present disclosure.

An earphone charging system 1' includes a wireless earphone device 11 and a charging control device 12'. In this embodiment, the wireless earphone device 11 includes a first wireless earphone 11-1 and a second wireless earphone 11-2. In other embodiments, the wireless earphone device 11 can include only one wireless earphone.

The wireless earphone device 11 is communicatively connected to an audio providing device 10. The first wireless earphone 11-1 and the second wireless earphone 11-2 of the wireless earphone device 11 can both be communicatively connected to the audio providing device 10. Moreover, the first wireless earphone 11-1 of the wireless earphone device 11 can be communicatively connected to the audio providing device 10 to receive an audio signal, and then the first wireless earphone 11-1 performs transmission of the audio signal with the second wireless earphone 11-2.

Reference is made to FIG. 3, in this embodiment, when the first wireless earphone 11-1 and the second wireless earphone 11-2 of the wireless earphone device 11 have low power, a user can connect the first wireless earphone 11-1 and the second wireless earphone 11-2 of the wireless earphone device 11 to the charging control device 12', and connect the charging control device 12' to the audio providing device 10, such that the first wireless earphone 11-1 and the second wireless earphone 11-2 of the wireless earphone device 11 are charged. At this time, the first wireless earphone 11-1 and the second wireless earphone 11-2 of the wireless earphone device 11 can be used in a way similar to that of a wired earphone, such that the wireless earphone device 11 is charged and the user can listen to audio contents without having to pause various services.

In this embodiment, the charging control device 12' is electrically connected to the first wireless earphone 11-1 and the second wireless earphone 11-2 through a second cable CAB2. The charging control device 12' is electrically connected to the audio providing device 10 through a first cable CAB1. Each of the first wireless earphone 11-1 and the second wireless earphone 11-2 has two charging contacts. The second cable CAB2 is a connecting wire that is in the shape of the letter Y, a single connection end is connected to the charging control device 12', and each of two branched ends is connected to the two charging contacts of the first wireless earphone 11-1 and of the second wireless earphone 11-2, respectively.

When the first wireless earphone 11-1 and the second wireless earphone 11-2 of the wireless earphone device 11 are electrically connected to the charging control device 12' through the second cable CAB2, and the charging control device 12' is electrically connected to the audio providing device 10 through the first cable CAB1, the audio providing device 10 then provides power and the audio signal to the first wireless earphone 11-1 and the second wireless earphone 11-2 of the wireless earphone device 11 through the charging control device 12'.

That is to say, the audio providing device 10 transmits its own battery power to the first wireless earphone 11-1 and the second wireless earphone 11-2 of the wireless earphone device 11 through the charging control device 12', the first cable CAB1 and the second cable CAB2. Therefore, the first wireless earphone 11-1 and the second wireless earphone 11-2 are charged.

Reference is made to FIG. 3. Moreover, the charging control device 12' includes a processing module 121', an audio processing module 122', a hub circuit 123', a charging processing module 124', an external power connection port 125', and a power bypass circuit PA'.

The charging control device 12' further includes a first connection port CON1' and a second connection port CON2', the audio providing device 10 is electrically connected to the first connection port CON1' through the first cable CAB1, and the first wireless earphone 11-1 and the second wireless earphone 11-2 are electrically connected to the second connection port CON2' through the second cable CAB2. The first cable CAB1 and the first connection port CON1' can be integrally disposed or detachably disposed. The second cable CAB2 and the second connection port CON2' can be integrally disposed or detachably disposed.

The first connection port CON1' is electrically connected to the hub circuit 123', the hub circuit 123' is electrically connected to the charging processing module 124' and the processing module 121', and the processing module 121' is electrically connected to the audio processing module 122'. The audio processing module 122' is electrically connected to the second connection port CON2', the charging processing module 124' is electrically connected to the external power connection port 125', and the power bypass circuit PA' is disposed between the external power connection port 125' and the second connection port CON2'.

In this embodiment, the external power connection port 125' of the charging control device 12' is used to be electrically connected to an external voltage supply for receiving external power from the external voltage supply. The power bypass circuit PA' of the charging control device 12' is disposed between the external power connection port 125' and the second connection port CON2'. In this embodiment, the external voltage supply is a direct current (DC) voltage supply. The external voltage supply is a portable power bank or a DC-to-DC voltage convertor. The charging processing module 124' is a charging chip for converting the external power to an appropriate DC voltage. The hub circuit 123' is a circuit for adjusting the transmission of the audio signal and the power.

Referring to FIG. 3, when the audio providing device 10, the first wireless earphone 11-1 and the second wireless earphone 11-2 of the wireless earphone device 11 are connected to the charging control device 12', and the charging control device 12' is electrically connected to the external voltage supply, the charging control device 12' receives the external power. The external power is provided to the first wireless earphone 11-1 and the second wireless earphone 11-2 of the wireless earphone device 11 through the power bypass circuit PA', such that the first wireless earphone 11-1 and the second wireless earphone 11-2 of the wireless earphone device 11 are charged.

Figure 4:
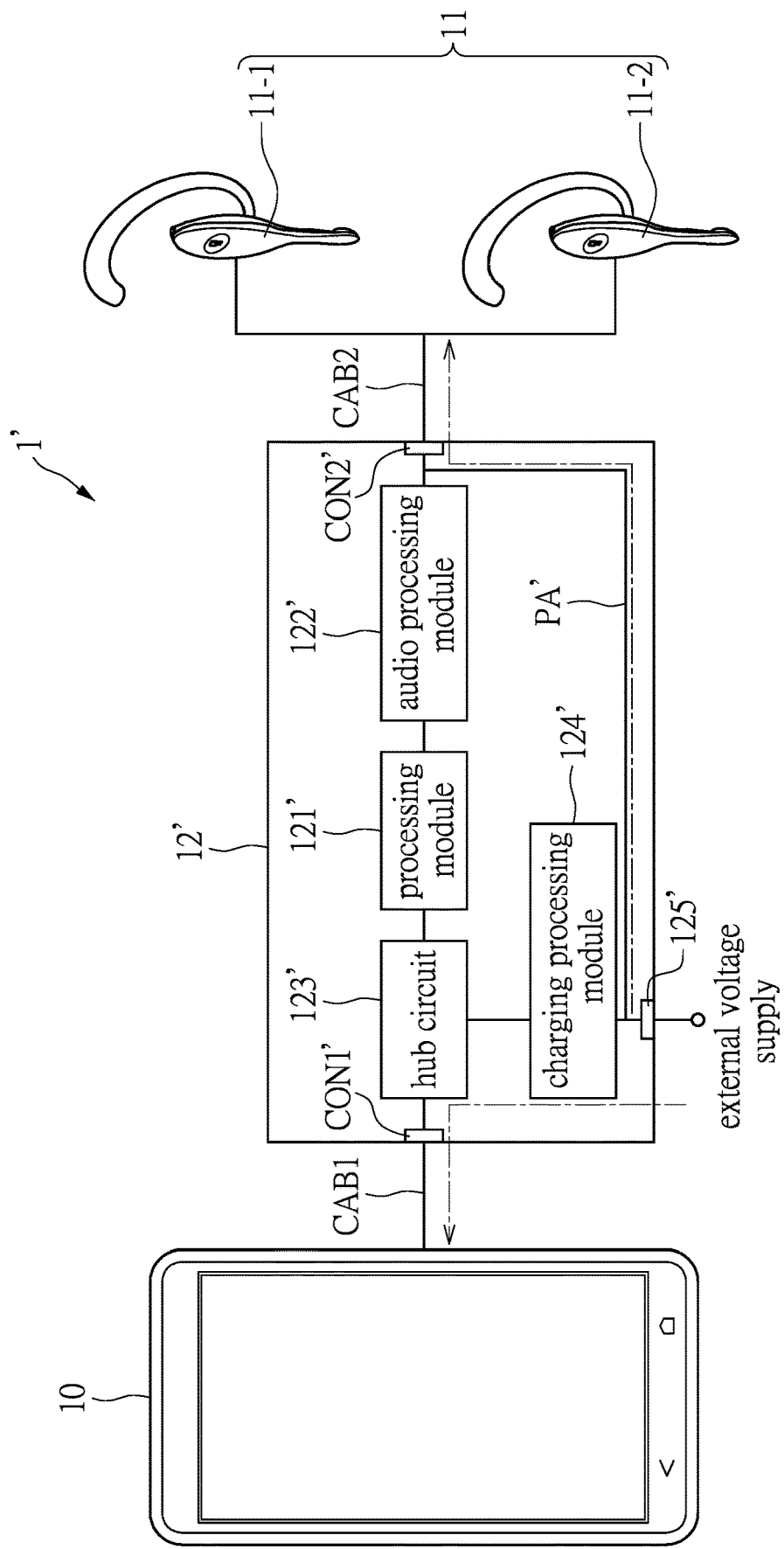
FIG. 4 is another schematic view of the wireless earphone device being charged when the charging control device is in cooperation with the wireless earphone device and the audio providing device according to the second embodiment of the present disclosure.

Reference is made to FIG. 4, which is another schematic view of the wireless earphone device being charged when the charging control device is in cooperation with the wireless earphone device and the audio providing device according to the second embodiment of the present disclosure.

When the audio providing device 10, the first wireless earphone 11-1 and the second wireless earphone 11-2 of the wireless earphone device 11 are connected to the charging control device 12', and the charging control device 12' is electrically connected to the external voltage supply, the external power is provided to the first wireless earphone 11-1 and the second wireless earphone 11-2 through the power bypass circuit PA', such that the first wireless earphone 11-1 and the second wireless earphone 11-2 are charged.

In this embodiment, the external power provided by the external voltage supply is also provided to the audio providing device 10 through the charging processing module 124' and the hub circuit 123', and the audio providing device 10 provides the audio signal to the first wireless earphone 11-1 and the second wireless earphone 11-2 of the wireless earphone device 11 through the hub circuit 123', the processing module 121' and the audio processing module 122'. That is to say, in this embodiment, when the charging control device 12' is connected to the external voltage supply, the audio providing device 10 and the wireless earphone device 11 are simultaneously charged by the external voltage supply. Moreover, the charging control device 12' facilitates the external power from the external voltage supply to pass through different charging routes, such that the audio providing device 10 and the wireless earphone device 11 are charged.

Figure 5:
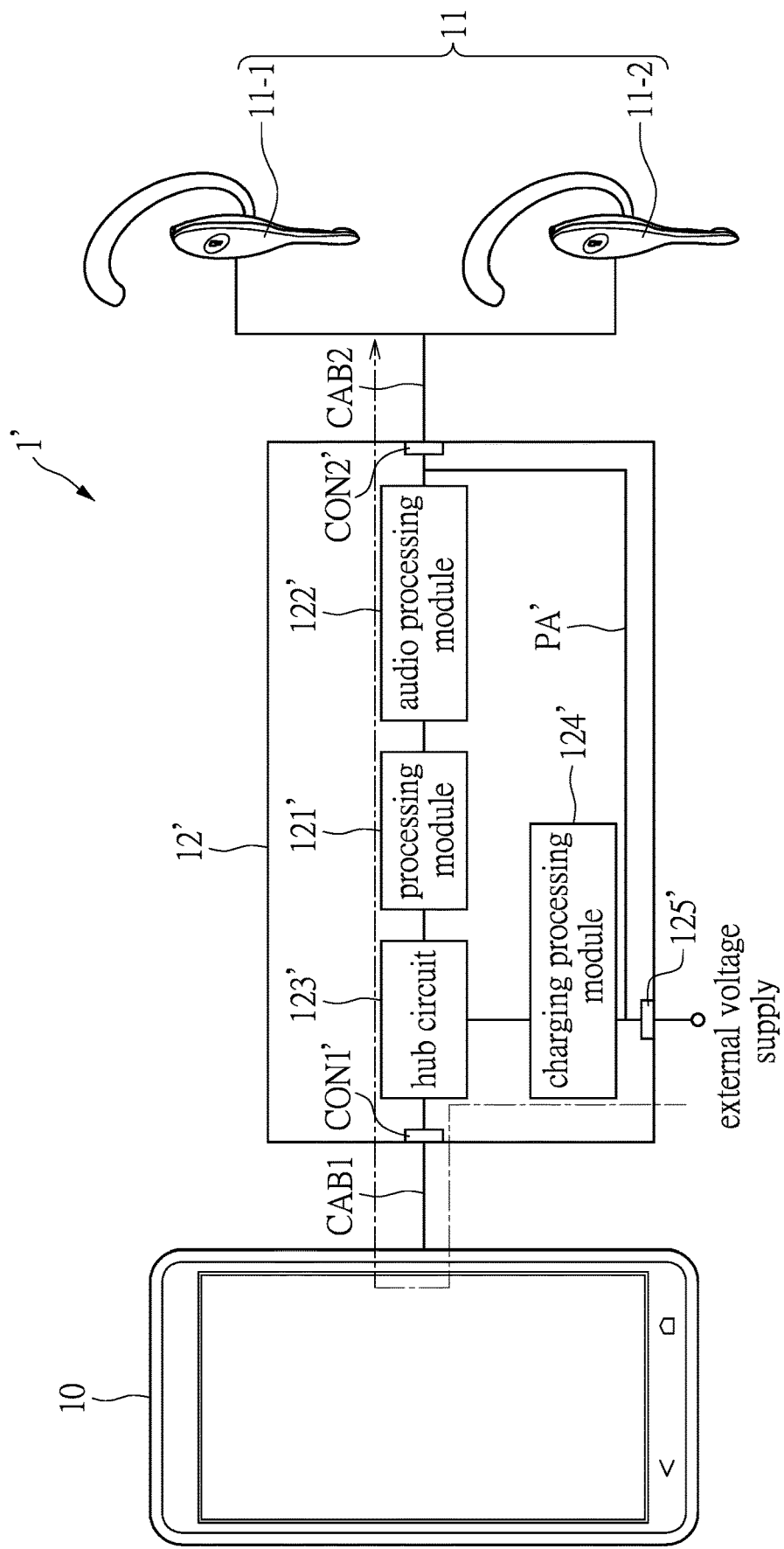
FIG. 5 is yet another schematic view of the wireless earphone device being charged when the charging control device is in cooperation with the wireless earphone device and the audio providing device according to the second embodiment of the present disclosure.

Referring to FIG. 5, which is yet another schematic view of the wireless earphone device being charged when the charging control device is in cooperation with the wireless earphone device and the audio providing device according to the second embodiment of the present disclosure.

When the audio providing device 10, the first wireless earphone 11-1 and the second wireless earphone 11-2 of the wireless earphone device 11 are connected to the charging control device 12', and the charging control device 12' is electrically connected to the external voltage supply, all of the external power is provided to the audio providing device 10 through the charging processing module 124' and the hub circuit 123'. The audio providing device 10 then provides the power and the audio signal to the first wireless earphone 11-1 and the second wireless earphone 11-2 of the wireless earphone device 11 through the hub circuit 123', the processing module 121' and the audio processing module 122'.

Beneficial Effects of the Embodiments

One of the advantages of the present disclosure is that, the charging control device and the earphone charging system of the present disclosure allows the wireless earphone device and the audio providing device to be charged without interrupting services and user experiences, thereby effectively elevating the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An earphone charging system, comprising:
a wireless earphone device communicatively connected to an audio providing device; and
a charging control device electrically connected to the audio providing device through a first cable, and the charging control device electrically connected to the wireless earphone device through a second cable;
wherein the audio providing device provides power and an audio signal to the wireless earphone device through the charging control device, the power and the audio signal are provided to the wireless earphone device through different routes, the charging control device includes a power bypass circuit, and the audio providing device provides the power to the wireless earphone device through the power bypass circuit.

2. The earphone charging system according to claim 1, wherein the wireless earphone device includes a first wireless earphone and a second wireless earphone.

3. The earphone charging system according to claim 2, wherein the charging control device includes a processing module, and an audio processing module, the processing module being electrically connected to the audio processing module and the power bypass circuit, the processing module being electrically connected to the audio providing device through the first cable, the audio processing module being electrically connected to the first wireless earphone and the second wireless earphone through the second cable, the audio providing device providing the power to the first wireless earphone and the second wireless earphone through the power bypass circuit, and the audio providing device providing the audio signal to the first wireless earphone and the second wireless earphone through the processing module and the audio processing module.

4. The earphone charging system according to claim 3, wherein the charging control device further includes a first connection port and a second connection port, the processing module being electrically connected to the first connection port, the audio providing device being electrically connected to the first connection port through the first cable, the audio processing module being electrically connected to the second connection port, and the first wireless earphone and the second wireless earphone being electrically connected to the second connection port through the second cable.

5. The earphone charging system according to claim 1, wherein the audio providing device is a mobile phone, a tablet computer or an audio player.

6. An earphone charging system, comprising:
a wireless earphone device communicatively connected to an audio providing device; and
a charging control device electrically connected to the audio providing device through a first cable, the charging control device being electrically connected to the wireless earphone device through a second cable, and the charging control device including an external power connection port so as to be electrically connected to an external voltage supply and to receive external power from the external voltage supply;
wherein the external power provided by the external voltage supply simultaneously charges the audio providing device and the wireless earphone device through the charging control device, the charging control device includes a power bypass circuit, and the external power is provided to the wireless earphone device through the power bypass circuit.

7. The earphone charging system according to claim 6, wherein the wireless earphone device includes a first wireless earphone and a second wireless earphone.

8. The earphone charging system according to claim 7, wherein the charging control device further includes a first connection port and a second connection port, the audio providing device being electrically connected to the first connection port through the first cable, and the first wireless earphone and the second wireless earphone of the wireless earphone device being electrically connected to the second connection port through the second cable.

9. The earphone charging system according to claim 8, wherein the power bypass circuit is disposed between the external power connection port and the second connection port, and wherein, when the charging control device is electrically connected to the external voltage supply, the charging control device receives the external power, and the external power is provided to the first wireless earphone and the second wireless earphone of the wireless earphone device through the power bypass circuit.

10. The earphone charging system according to claim 8, wherein the charging control device further includes a hub circuit, a charging processing module, a processing module and an audio processing module, the first connection port being electrically connected to the hub circuit, the hub circuit being electrically connected to the charging processing module and the processing module, the processing module being electrically connected to the audio processing module, the audio processing module being electrically connected to the second connection port, the charging processing module being electrically connected to the external power connection port, and the power bypass circuit being disposed between the external power connection port and the second connection port.

11. The earphone charging system according to claim 10, wherein, when the charging control device is electrically connected to the external voltage supply, the external power is provided to the first wireless earphone and the second wireless earphone of the wireless earphone device through the power bypass circuit, such that the first wireless earphone and the second wireless earphone of the wireless earphone device are charged, wherein the external power is provided to the audio providing device through the charging processing module and the hub circuit, and wherein the audio providing device provides the audio signal to the first wireless earphone and the second wireless earphone of the wireless earphone device through the hub circuit, the processing module and the audio processing module.

12. The earphone charging system according to claim 10, wherein, when the charging control device is electrically connected to the external voltage supply, all of the external power is provided to the audio providing device through the charging processing module and the hub circuit, and the audio providing device then provides the power and the audio signal to the first wireless earphone and the second wireless earphone of the wireless earphone device through the hub circuit, the processing module and the audio processing module.

13. A charging control device for connecting an audio providing device and a wireless earphone device, the charging control device comprising:
a first connection port; and
a second connection port;
wherein the first connection port of the charging control device is electrically connected to the audio providing device through a first cable, and the second connection port of the charging control device is electrically connected to the wireless earphone device through a second cable;
wherein the wireless earphone device receives power through the charging control device to perform charging, the audio providing device provides an audio signal to the wireless earphone device through the charging control device, the power and the audio signal are provided to the wireless earphone device through different routes, the charging control device includes a power bypass circuit, and the audio providing device provides the power to the wireless earphone device through the power bypass circuit.

14. The charging control device according to claim 13, wherein the wireless earphone device includes a first wireless earphone and a second wireless earphone, and wherein the audio providing device provides power to the wireless earphone device through the charging control device to perform charging.

15. The charging control device according to claim 14, further comprising a processing module and an audio processing module, the processing module being electrically connected to the audio processing module and the power bypass circuit, the processing module being electrically connected to the audio providing device through the first cable, the audio processing module being electrically connected to the first wireless earphone and the second wireless earphone through the second cable, the audio providing device providing the power to the first wireless earphone and the second wireless earphone through the power bypass circuit, and the audio providing device providing the audio signal to the first wireless earphone and the second wireless earphone through the processing module and the audio processing module.

16. The charging control device according to claim 15, wherein, when the charging control device is electrically connected to the external voltage supply, all of the external power is provided to the audio providing device through the charging processing module and the hub circuit, and the audio providing device then provides the power and the audio signal to the first wireless earphone and the second wireless earphone of the wireless earphone device through the hub circuit, the processing module and the audio processing module.

17. The charging control device according to claim 14, further comprising an external power connection port so as to be electrically connected to an external voltage supply and receive external power from the external voltage supply.

18. The charging control device according to claim 17, wherein the power bypass circuit is disposed between the external power connection port and the second connection port, wherein, when the charging control device is electrically connected to the external voltage supply, the charging control device receives the external power, and the external power is provided to the first wireless earphone and the second wireless earphone of the wireless earphone device through the power bypass circuit.

19. The charging control device according to claim 18, further comprising a hub circuit, a charging processing module, a processing module, a power bypass circuit and an audio processing module, the first connection port being electrically connected to the hub circuit, the hub circuit being electrically connected to the charging processing module and the processing module, the processing module being electrically connected to the audio processing module, the audio processing module being electrically connected to the second connection port, the charging processing module being electrically connected to the external power connection port, and the power bypass circuit being disposed between the external power connection port and the second connection port.

20. The charging control device according to claim 19, wherein, when the charging control device is electrically connected to the external voltage supply, the external power is provided to the first wireless earphone and the second wireless earphone of the wireless earphone device through the power bypass circuit, such that the first wireless earphone and the second wireless earphone of the wireless earphone device are charged, and wherein the external power is provided to the audio providing device through the charging processing module and the hub circuit, and the audio providing device provides the audio signal to the first wireless earphone and the second wireless earphone of the wireless earphone device through the hub circuit, the processing module and the audio processing module.

* * * * *